E. MENZ & J. L. JACKSON.
TARE BEAM FOR SCALES.
APPLICATION FILED DEC. 11, 1913.

1,155,259.

Patented Sept. 28, 1915.

WITNESSES:
O. M. McLaughlin
A H Edgerton

INVENTORS
Emil Menz and
John L. Jackson
BY
V. H. Lockwood
ATTORNEY

COLUMBIA PLANOGRAPH CO., WASHINGTON, D. C.

UNITED STATES PATENT OFFICE.

EMIL MENZ AND JOHN L. JACKSON, OF HAMILTON, OHIO, ASSIGNORS, BY MESNE ASSIGNMENTS, TO THE COMPUTING SCALE COMPANY, OF DAYTON, OHIO, A CORPORATION.

TARE-BEAM FOR SCALES.

1,155,259. Specification of Letters Patent. Patented Sept. 28, 1915.

Application filed December 11, 1913. Serial No. 805,919.

*To all whom it may concern:*

Be it known that we, EMIL MENZ and JOHN L. JACKSON, citizens of the United States, and residents of Hamilton, county of Butler, and State of Ohio, have invented a certain new and useful Tare-Beam for Scales; and we do hereby declare that the following is a full, clear, and exact description thereof, reference being had to the accompanying drawings, in which like letters refer to like parts.

The object of this invention is to increase the weighing capacity of weighing scales, and the chief feature contributing to this result is the provision on a beam of a series of graduations with a series of lower and another series of higher indicating numerals, and two poises on said tare beam, one for each series of numerals, and each arranged so that it will disclose the indicating numerals in its corresponding series and conceal the numeral in the other series and when the two poises are associated, they disclose only the higher indicating numeral and conceal the lower indicating numeral.

The nature of the invention will be understood from the accompanying drawings and the following description and claims.

Figure 1:
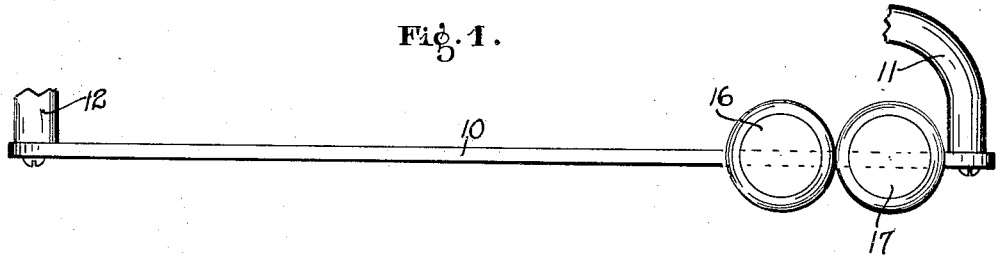
Figure 2:
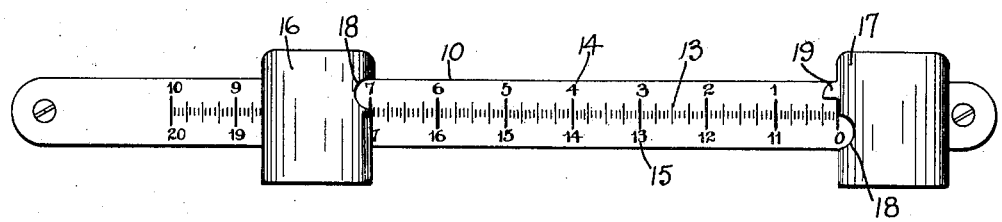
Figure 3:
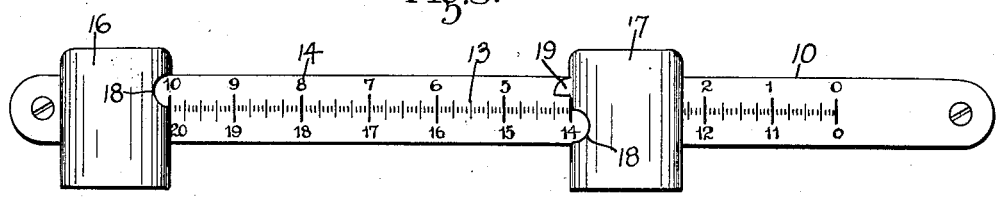
Figure 4:
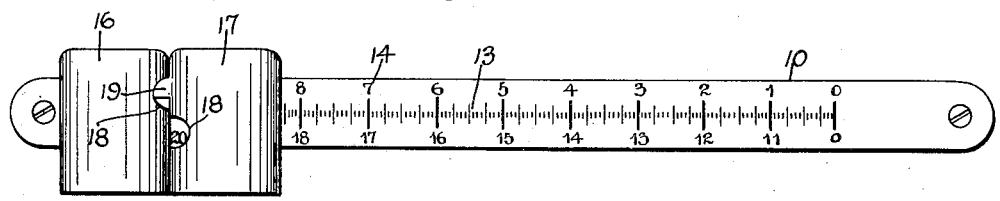

In the drawings, Figure 1 is a plan view of the tare beam with the parts for connecting it to the main beam of the scale being broken away. Fig. 2 is a front elevation of the tare beam with one poise at zero and the other indicating seven pounds. Fig. 3 is the same with one poise moved to its limit and the other indicating fourteen pounds. Fig. 4 is the same with both poises moved to the limit and indicating twenty pounds.

No weighing scale is herein shown as this invention may be employed with any type of weighing scale employing a lever or beam. There is shown a tare beam 10 of usual size and connected with the main weighing beam by the connections 11 and 12 in the usual manner. The particular arrangement of these parts is immaterial.

The tare beam has on it the usual series of graduations 13 located midway between the top and bottom edges thereof and above said graduations there is a series of lower numerals 14 representing pounds from one pound up to ten pounds and below said series of graduations there is a row of numerals 15 which represent from ten pounds to twenty pounds. The single series of graduations suffices for both series of numerals as the series of graduations is a ten pound series.

There are two poises 16 and 17 on said tare beam and they should be of such relative weights that upon the movement of either poise between one indicating numeral and the next, there would be a pound of weight indicated. The only difference between the poises is that they are so weighted relatively that the right-hand edge of the poise 16 is the reading edge and the left-hand edge of the poise 17 is the reading edge. Each poise has in it a notch or recess 18 adapted to register with indicating numerals and disclose the same at the reading line. The poise 17 has a projection 19 which enters the notch or recess 18 in the poise 16 when the two poises are together and conceals the numeral in the upper series at the reading line, as shown in Fig. 4. With this arrangement when the two poises are at zero, as shown in Fig. 1, the cipher in the lower series will be visible through the recess 18 in the poise 17. This indicates that the poises on the tare beam are at zero.

A tare beam is in itself employed often for increasing the capacity of weighing scales and often for offsetting the weight of the jar, can or other goods receiver on the platform of the scale. If the article being weighed requires less than ten pounds indication on the tare beam, then the poise 16 is moved, as shown in Fig. 2, where it indicates seven pounds. The poise 16 cannot indicate over ten pounds, as shown in Fig. 3, and if more than ten pounds tare is needed, then the poise 17 is moved. Thus in Fig. 3, there is fourteen pounds tare, as indicated at the reading line of the poise 17. The tare may be increased to twenty pounds, as shown in Fig. 4, where both poises are at their limit of movement and they indicate twenty pounds. Thus, it is seen that without increasing the size of the scale or the tare beam, the capacity thereof may be doubled by employing two series of indicating numerals associated with one series of graduations and employing two poises.

The invention is:

1. A beam for weighing scales having thereon a series of graduation marks, and upper and lower series of indicating numerals associated with said series of graduation marks, a poise on said beam for each series of indicating numerals, said poises being arranged so that their adjacent edges will constitute their reading lines, each poise having a recess in the reading edge, the recess in one poise registering with the upper series of indicating marks only and the recess in the other poise registering with the lower series of indicating marks only.

2. A beam for weighing scales having thereon a series of graduation marks and a plurality of series of indicating numerals associated with said series of graduation marks, a poise on said beam for each series of said indicating numerals, said poises being arranged so that their adjacent edges will constitute their reading lines, and a projection from the reading line of one of said poises for concealing the indicating numeral in the other series of indicating numerals which is located at the reading line of such poise.

In witness whereof, we have hereunto affixed our signatures in the presence of the witnesses herein named.

EMIL MENZ.
JOHN L. JACKSON.

Witnesses:
H. EASTMAN,
ROBT. KENNEDY.

Copies of this patent may be obtained for five cents each, by addressing the "Commissioner of Patents, Washington, D. C."